(12) United States Patent
Menyo et al.

(10) Patent No.: US 11,629,202 B2
(45) Date of Patent: *Apr. 18, 2023

(54) DUAL CURE STEREOLITHOGRAPHY RESINS CONTAINING THERMOPLASTIC PARTICLES

(71) Applicant: Carbon, Inc., Redwood City, CA (US)

(72) Inventors: Matthew S. Menyo, San Francisco, CA (US); Lloyd M. Robeson, Macungie, PA (US)

(73) Assignee: Carbon, Inc., Redwood City, CA (US)

( * ) Notice: Subject to any disclaimer, the term of this patent is extended or adjusted under 35 U.S.C. 154(b) by 944 days.

This patent is subject to a terminal disclaimer.

(21) Appl. No.: 16/474,971

(22) PCT Filed: Jan. 3, 2018

(86) PCT No.: PCT/US2018/012158
§ 371 (c)(1),
(2) Date: Jun. 28, 2019

(87) PCT Pub. No.: WO2018/129020
PCT Pub. Date: Jul. 12, 2018

(65) Prior Publication Data
US 2019/0345270 A1    Nov. 14, 2019

Related U.S. Application Data

(60) Provisional application No. 62/442,615, filed on Jan. 5, 2017.

(51) Int. Cl.
| | |
|---|---|
| *C08F 2/48* | (2006.01) |
| *B33Y 10/00* | (2015.01) |
| *B33Y 70/00* | (2020.01) |
| *B29C 64/129* | (2017.01) |
| *C08L 33/12* | (2006.01) |
| *C08F 2/60* | (2006.01) |
| *B33Y 40/00* | (2020.01) |
| *B29C 64/124* | (2017.01) |
| *B29C 64/35* | (2017.01) |
| *C08F 222/26* | (2006.01) |
| *C08L 33/14* | (2006.01) |
| *C08L 35/02* | (2006.01) |
| *C08L 63/00* | (2006.01) |
| *C08L 69/00* | (2006.01) |
| *C08L 79/08* | (2006.01) |
| *C08L 81/06* | (2006.01) |
| *C08F 222/40* | (2006.01) |
| *B29K 501/12* | (2006.01) |

(52) U.S. Cl.
CPC .............. *C08F 2/48* (2013.01); *B29C 64/124* (2017.08); *B29C 64/129* (2017.08); *B29C 64/35* (2017.08); *B33Y 10/00* (2014.12); *B33Y 40/00* (2014.12); *B33Y 70/00* (2014.12); *C08F 2/60* (2013.01); *C08F 222/26* (2013.01); *C08F 222/40* (2013.01); *C08F 222/404* (2020.02); *C08L 33/12* (2013.01); *C08L 33/14* (2013.01); *C08L 35/02* (2013.01); *C08L 63/00* (2013.01); *C08L 69/00* (2013.01); *C08L 79/08* (2013.01); *C08L 81/06* (2013.01); *B29K 2501/12* (2013.01)

(58) Field of Classification Search
CPC .. C08F 2/48; C08F 2/60; C08F 222/26; C08F 222/40; C08F 222/404; C08F 222/10; B29C 64/124; B29C 64/129; B29C 64/35; B33Y 10/00; B33Y 40/00; B33Y 70/00; C08L 33/12; C08L 33/14; C08L 35/02; C08L 63/00; C08L 69/00; C08L 79/08; C08L 81/06; B29K 2501/12
See application file for complete search history.

(56) References Cited

U.S. PATENT DOCUMENTS

| | | |
|---|---|---|
| 5,236,637 A | 8/1993 | Hull |
| 5,391,072 A | 2/1995 | Lawton et al. |
| 5,529,473 A | 6/1996 | Lawton et al. |
| 7,438,846 B2 | 10/2008 | John |
| 7,892,474 B2 | 2/2011 | Shkolnik et al. |
| 8,110,135 B2 | 2/2012 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |

(Continued)

FOREIGN PATENT DOCUMENTS

| | | |
|---|---|---|
| WO | 2014/077848 | 5/2014 |
| WO | 2015/200173 | 12/2015 |

(Continued)

OTHER PUBLICATIONS

International Search Report and Written Opinion of the International Searching Authority corresponding to International Patent Application No. PCT/US2018/012158 (13 pages) (dated May 17, 2018).

(Continued)

*Primary Examiner* — Jessica M Roswell
(74) *Attorney, Agent, or Firm* — Myers Bigel, P.A.

(57) ABSTRACT

Provided herein according to some embodiments is a dual cure stereolithography resin that includes thermoplastic particles, which thermoplastic particles are insoluble in the resin and insoluble during a first, light, cure in which an intermediate object is produced, but then dissolve or swell in the intermediate object during the second, heat, cure.

23 Claims, 1 Drawing Sheet

(56) References Cited

U.S. PATENT DOCUMENTS

| | | |
|---|---|---|
| 2013/0237630 A1 | 9/2013 | Morooka et al. |
| 2013/0292862 A1 | 11/2013 | Joyce |
| 2013/0295212 A1 | 11/2013 | Chen et al. |
| 2016/0136889 A1 | 5/2016 | Rolland et al. |
| 2016/0137838 A1 | 5/2016 | Rolland et al. |
| 2016/0160077 A1 | 6/2016 | Rolland et al. |
| 2017/0218149 A1* | 8/2017 | Schmidt .................... C08J 5/24 |

FOREIGN PATENT DOCUMENTS

| | | | | |
|---|---|---|---|---|
| WO | 2015-200189 | | 12/2015 | |
| WO | WO 2016-020250 | * | 2/2016 | ............... C08J 5/04 |
| WO | 2016/126796 | | 8/2016 | |

OTHER PUBLICATIONS

Tumbleston et al., Continuous liquid interface production of 3D objects, Science, 2015, vol. 347, Issue 6228, pp. 1349-1352.

Janusziewicz et al., Layerless fabrication with continuous liquid interface production, Proc. Natl. Acad. Sci. USA, vol. 113, 2016, pp. 11703-11708.

Written Opinion of the International Searching Authority corresponding to International Patent Application No. PCT/US2018/012161 (9 pages) (dated Jul. 9, 2019).

* cited by examiner

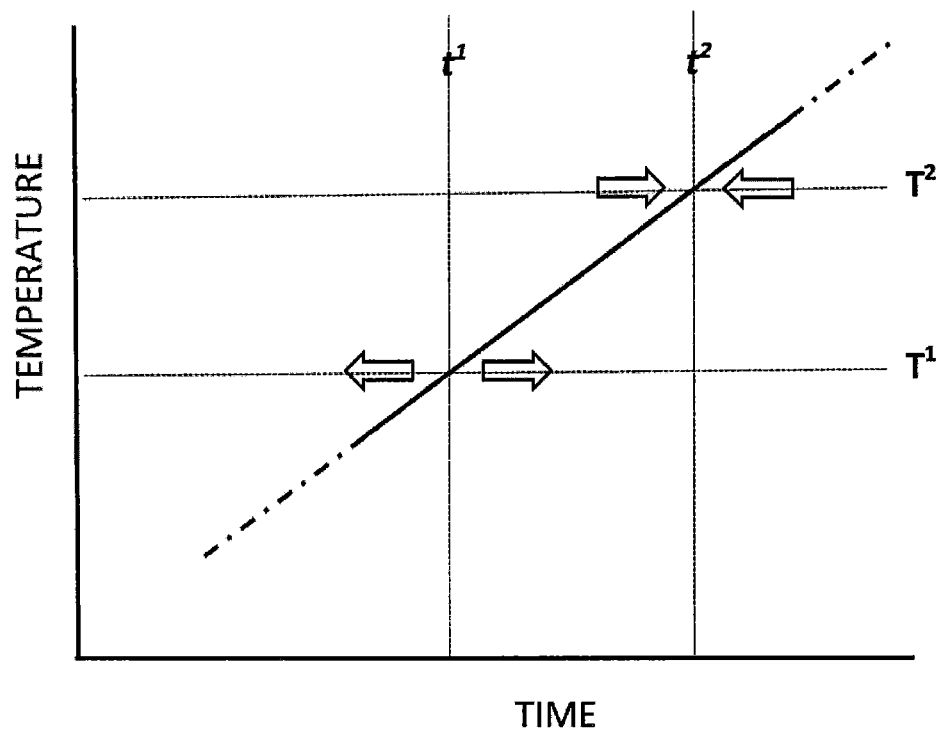

DUAL CURE STEREOLITHOGRAPHY RESINS CONTAINING THERMOPLASTIC PARTICLES

RELATED APPLICATIONS

This application is a 35 U.S.C. § 371 national phase application of International Application Serial No. PCT/US2018/012158, filed Jan. 3, 2018, which claims the benefit of U.S. provisional patent application Ser. No. 62/442,615, filed Jan. 5, 2017, the disclosure of which is incorporated by reference herein in its entirety.

FIELD OF THE INVENTION

The present invention concerns materials, methods and apparatus for the fabrication of solid three-dimensional objects from liquid materials, and objects so produced.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Generally referred to as "stereolithography," two particular techniques are known: one in which new layers are formed at the top surface of the growing object; the other in which new layers are formed at the bottom surface of the growing object. Examples of such methods include those given in U.S. Pat. No. 5,236,637 to Hull (see, e.g., FIGS. 3-4), U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, US Patent Application Publication No. 2013/0292862 to Joyce, and US Patent Application Publication No. 2013/0295212 to Chen et al.

More recently, techniques referred to as "continuous liquid interface production" (or "CLIP") have been developed. These techniques enable the rapid production of three-dimensional objects in a layerless manner, by which the parts may have desirable structural and mechanical properties. See, e.g., J. DeSimone et al., PCT Application Nos. PCT/US2014/015486 (published as U.S. Pat. No. 9,211,678); PCT/US2014/015506 (published as U.S. Pat. No. 9,205,601), PCT/US2014/015497 (published as U.S. Pat. No. 9,216,546), J. Tumbleston, et al., *Continuous liquid interface production of* 3D Objects, Science 347, 1349-1352 (published online 16 Mar. 2015), and R. Janusziewcz et al., Layerless fabrication with continuous liquid interface production, *Proc. Natl. Acad. Sci. USA* 113, 11703-11708 (Oct. 18, 2016).

Dual cure stereolithography resins suitable for stereolithography techniques (particularly for CLIP) are described in J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/0160077), and PCT/US2015/036946 (see also U.S. Pat. No. 9,453,142). These resins usually include a first polymerizable system typically polymerized by light (sometimes referred to as "Part A") from which an intermediate object is produced, and also include at least a second polymerizable system ("Part B") which is usually cured after the intermediate object is first formed, and which imparts desirable structural and/or tensile properties to the final object. While making possible a still greater variety of structural and mechanical properties for objects produced by these methods, there remains a need for additional resins, particularly where enhanced or specific structural properties in the finished object may be desired.

SUMMARY OF THE INVENTION

A first aspect of the invention is a dual cure stereolithography resin that includes thermoplastic particles, which thermoplastic particles are insoluble in the resin and insoluble during a first, light, cure in which an intermediate object is produced, but then dissolve or swell in the intermediate object during the second, heat, cure. In some embodiments, inclusion of such particles enhances toughness of the resulting product without unduly limiting processability (e.g., increasing viscosity) of the resin.

A second aspect of the invention is a dual cure stereolithography resin that includes a Diels-Alder adduct, which adduct is light polymerizable in the first, light, cure to produce an intermediate object, and on heating the intermediate object yields a bis-maleimide that can further react and/or polymerize during the second, heat, cure. In some embodiments, inclusion of such a Diels-Alder adduct in resins that contain thermoplastic particles as described herein enhances the dissolution and/or solubility of the thermoplastic particles during the second, heat, cure.

Thus, in some aspects, the present invention provides a dual cure resin useful for making a three-dimensional object by stereolithography, including: (a) light-polymerizable monomers and/or prepolymers that can participate in forming an intermediate object by stereolithography (preferably included in an amount of from 5, 10, or 20 percent by weight, to 50, 60, or 80 percent by weight); (b) heat-polymerizable monomers and/or prepolymers (preferably included in an amount of from 5, 10 or 20 percent by weight, to 40, 50 or 60 percent by weight); (c) thermoplastic particles dispersed in the resin, which particles are (i) insoluble in the the resin and insoluble during a first, light, cure in which an intermediate object is produced, and which particles (ii) dissolve or swell in the intermediate object during a second, heat, cure thereof (preferably included in an amount of from 1 or 5 percent by weight to 20, 30, or 50 percent by weight); (d) optionally, but in some embodiments preferably, a Diels-Alder adduct, which adduct is light polymerizable during stereolithography and so can participate in forming an intermediate object, and on heating of the intermediate object yield a bis-maleimnide that can further react and/or polymerize in the intermediate object during heat cure thereof to thereby form the three-dimensional object (e.g., where the Diels-Alder adduct and the light-polymerizable monomers and/or prepolymers are included in a combined amount of from 30 to 80 percent by weight); and (e) optionally, a hardener (e.g., a maleimide-reactive hardener) (e.g., included in an amount of at least 1, 5, or 10 percent by weight, up to 40 or 50 percent by weight).

In other aspects, the present invention provides a dual cure resin useful for making a three-dimensional object by stereolithography, including: (a) optionally, but in some embodiments preferably, light-polymerizable monomers and/or prepolymers that can participate in forming an intermediate object by stereolithography (when included, included in an amount of from 1, 5, or 10 percent by weight, to 50, 60, or 80 percent by weight); (b) optionally, but in some embodiments preferably, heat-polymerizable monomers and/or prepolymers (when included, included in an amount of from 5 or 10 percent by weight, to 50 or 60 percent by weight); (c) optionally, but in some embodiments preferably, thermoplastic particles dispersed in the resin, which particles are (i) insoluble in the the resin and insoluble during a first, light, cure in which a three-dimensional intermediate is produced, and which particles (ii) dissolve or swell in the intermediate during a second, heat, cure thereof (when included, included in an amount of from 1 or 5 percent by weight to 20 or 30 percent by weight); (d) a Diels-Alder adduct, which adduct is light polymerizable during stereolithography and so can participate in forming an intermediate object, and on heating of the intermediate object yield a bis-maleimide that can further react and/or polymerize in the intermediate object during heat cure thereof to thereby form the three-dimensional object (included in an amount of at least 1, 5, or 10 percent by weight, and with the Diels-Alder adduct and the light-polymerizable monomers and/or prepolymers together included in an amount of from 40 or 50 percent by weight, to 99 or 100 percent by weight); and (e) optionally, a hardener (e.g., a maleimide-reactive hardener) (e.g., included in an amount of at least 1, 5, or 10 percent by weight, up to 40 or 50 percent by weight).

In some embodiments of each of the foregoing, the thermoplastic particles solubilize or dissolve at a lower temperature than the temperature at which the heat-polymerizable monomers and/or prepolymers polymerize.

In some embodiments of the foregoing, the resin comprises a cyanate ester, epoxy, bis-maleimide, benzoxazine, or phenolic resin.

In some embodiments of the foregoing, the thermoplastic particles are comprised of a polymer having a glass transition temperature greater than 130° C.

In some embodiments of the foregoing, the thermoplastic particles are comprised of a thermoplastic polymer having a weight average molecular weight of from 1 or 10 kilodaltons, up to 100 or 1,000 kilodaltons.

In some embodiments of the foregoing, (i) the resin comprises a cyanate ester or epoxy resin, and the thermoplastic particles comprise polyethersulfone, polysulfone, polyarylsulfone, polyimide, polyetherimide, or a combination thereof; or (ii) the resin comprises a polyester resin (e.g., polycaprolactone resin, a polyethylene terephthalate resin), or a polymethacrylate resin, and the thermoplastic particles comprise bisphenol A (BPA) polycarbonate.

In some embodiments of each of the foregoing, the Diels-Alder adduct has a structure of Formula I:

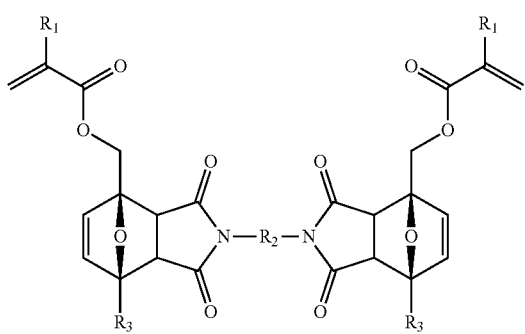

where $R_1$ and $R_3$ are each independently H or $CH_3$, and $R_2$ is a covalent linking group.

In some embodiments of the foregoing, the light polymerizable monomers and/or prepolymers comprise reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, vinyl ethers, and combinations thereof.

In some embodiments of the foregoing, the heat polymerizable monomers and/or prepolymers comprise reactive end groups selected from the group consisting of: epoxy/amine, epoxy/hydroxyl, oxetane/amine, oxetane/alcohol, isocyanate/hydroxyl, isocyanate/amine, isocyanate/carboxylic acid, cyanate ester, anhydride/amine, amine/carboxylic acid, amine/ester, hydroxyl/carboxylic acid, hydroxyl/acid chloride, amine/acid chloride, vinyl/Si—H, Si—Cl/hydroxyl, Si—Cl/amine, hydroxyl/aldehyde, amine/aldehyde, hydroxymethyl or alkoxymethyl amide/alcohol, aminoplast, alkyne/azide, click chemistry reactive groups, alkene/sulfur, alkene/thiol, alkyne/thiol, hydroxyl/halide, isocyanate/water, Si—OH/hydroxyl, Si—OH/water, Si—OH/Si—H, Si—OH/Si—OH, perfluorovinyl, diene/dienophiles, olefin metathesis polymerization groups, olefin polymerization groups for Ziegler-Natta catalysis, and ring-opening polymerization groups and mixtures thereof.

In some embodiments of the foregoing, the hardener comprises a compound having amine, thiol, vinyl ether, maleimide, or allyl reactive end groups.

In some embodiments of the foregoing, the resin further includes at least one photoinitiator (e.g., in an amount of from 0.1 to 1 or 5 percent by weight), optionally at least one dye (e.g., in an amount of 0.001 or 0.01 to 1 or 5 percent by weight), and optionally at least one filler (e.g., in an amount of 0.01 or 0.1 to 20 or 50 percent by weight).

A further aspect of the invention is a method of making a three-dimensional object, comprising: (a) providing a resin as described above or below; (b) producing by additive manufacturing a three-dimensional intermediate from the resin, the intermediate having the same shape as, or a shape to be imparted to, the three-dimensional object; (c) optionally washing the intermediate object; and then (d) heating the intermediate (i.e., to a temperature at which the heat-polymerizable monomers and/or prepolymers polymerize) to produce the three-dimensional object.

In some embodiments of the foregoing, the heating step (d) is carried out at a lower temperature than the glass transition temperature of the three-dimensional object.

In some embodiments of the foregoing, the thermoplastic particles solubilize or dissolve in the intermediate during the heating step (d).

In some embodiments of each of the foregoing, the thermoplastic particles solubilize or dissolve in the intermediate at a lower temperature than the temperature at which the heat-polymerizable monomers and/or prepolymers polymerize.

In some embodiments of the foregoing, the heating step comprises a first heating step during which the thermoplastic particles solubilize or dissolve, followed by a second heating step, at a temperature higher than the first heating step, during which the heat-polymerizable monomers and/or prepolymers polymerize to thereby form the three-dimensional object.

In some embodiments of the foregoing, during the heating step (d), the thermoplastic particles form a miscible interpenetrating network in the three-dimensional object, or phase separate into a morphology that toughens the three-dimensional object.

In some embodiments of the foregoing, the bis-maleimide has the structure of Formula III:

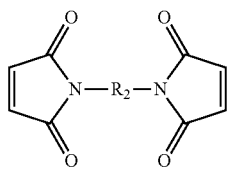

where $R_2$ is as given above for Formula I.

In some embodiments of the foregoing, the hardener is present, and the hardener reacts with the bis-maleimide during the heating step.

In some embodiments of the foregoing, the light polymerizable monomers and/or prepolymers form a solid polymer scaffold during the stereolithography step (b), which scaffold degrades during the heating step (d) and forms a constituent necessary for the polymerization of the heat polymerizable monomers and/or prepolymers.

In some embodiments of the foregoing, the producing step (b) is carried out by stereolithography (e.g., bottom-up stereolithography), such as by continuous liquid interface production (CLIP).

The present invention is explained in greater detail in the drawings and specification below. The disclosures of all United States patent references cited herein are to be incorporated herein by reference in their entirety.

BRIEF DESCRIPTION OF THE DRAWING

FIG. 1 schematically illustrates embodiments in which the dissolution rate of the thermoplastic particles is such that the particles solubilize or dissolve in the intermediate before cure of the thermosettable resin (e.g., before the heat-polymerizable monomers and/or prepolymers polymerize). $T^1$ represents the temperature at which the thermoplastic particles solubilize or dissolve in the intermediate, $T^2$ represents the temperature at which the heat-polymerizable monomers and/or prepolymers polymerize in the intermediate, and the difference between $t^1$ and $t^2$ represents the time required during the step of heating the intermediate to reach $T^2$ from $T^1$. In addition, in some embodiments $t^1$ and $T^1$ may represent the time and temperature at which the Diels-Alder adduct breaks into its constituent components (represented by arrows facing away from one another; e.g., re-forms the bis-maleimide), so that the constituent such as the bis-maleimide may participate in the subsequent heat-polymerization reaction (represented by arrows facing towards one another).

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product).

1. Dual Cure Resins.

Dual cure polymerizable liquids useful in additive manufacturing, particularly for stereolithogrpahy techniques such as continuous liquid interface production (CLIP) are known and described in, for example, J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/0160077), and PCT/US2015/036946 (see also U.S. Pat. No. 9,453,142). In general, such resins can comprise: (a) light-polymerizable monomers and/or prepolymers that can form an intermediate object (typically in the presence of a photocatalyst); and (b) heat-polymerizable monomers and/or prepolymers. As noted above, in some embodiments, these constituents may be supplemented, and/or replaced with, (c) thermoplastic particles and/or (d) Diels-Alder adducts. Each of these constituents is discussed further below.

A. Light-Polymerizable Monomers and/or Prepolymers.

Sometimes also referred to as "Part A" of the resin, these are monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification during photolithography. In some embodiments, this amount corresponds to less than ten, twenty, or thirty percent by weight of the total resin (polymerizable liquid) composition.

Examples of suitable reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step, as discussed further below.

B. Heat-Polymerizable Monomers and/or Prepolymers

Sometimes also referred to as "Part B," these constituents may comprise, consist of or consist essentially of a mix of monomers and/or prepolymers that possess reactive end groups that participate in a second solidification reaction after the Part A solidification reaction. In general, for dual cure resins, examples of methods used to solidify Part B include, but are not limited to, contacting the object or scaffold to heat, water or water vapor, light at a different wavelength than that at which Part A is cured, catalysts, (with or without additional heat), evaporation of a solvent from the polymerizable liquid (e.g., using heat, vacuum, or a combination thereof), microwave irradiation, etc., including combinations thereof. In some embodiments, heat curing of the "Part B" resins is preferred.

Examples of suitable reactive end group pairs suitable for Part B constituents, monomers or prepolymers include, but are not limited to: epoxy/amine, epoxy/hydroxyl, oxetane/amine, oxetane/alcohol, isocyanate*/hydroxyl, isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, aminoplast, alkyne/Azide (also known as one embodiment of "Click Chemistry," along with additional reactions including thiolene, Michael additions, Diels-Alder reactions, nucleophilic substitution reactions, etc.), alkene/sulfur (polybutadiene vulcanization), alkene/peroxide, alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), perfluorovinyl (coupling to form perfluorocyclobutane), etc., where *isocyanates include protected isocyanates (e.g., oximes)), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, siloxanes, epoxides, cyclic ethers, imines, cyclic acetals, etc.), etc. As will be noted from the above, the "Part B" components generally comprise at least a pair of compounds, reactive with one another (e.g., a polyisocyanate, and a polyamine).

C. Thermoplastic Particles.

Thermoplastic polymer particles as used herein are those that are not initially soluble in the polymerizable liquid, but can be dispersed in the liquid below the dissolution temperature thereof. "Insoluble" as used herein refers to both completely insoluble polymer particles, and poorly soluble particles which dissolve so slowly that they can be dispersed in the resin without dissolving to such an extent that they cannot be light polymerized as particles in the resin during production of a three-dimensional intermediate. Thus, the particles may be initially dispersed rather than dissolved or solubilized for any reason, including but not limited to inherently immisciblity/insolubility, Upper Critical Solution Temperature (UCST), crystallization, encapsulation in a shell which melts/degrades at high temperatures (e.g., wax melt, crystal melt, hydrogen bonding, degradation at high temperature, etc.).

Optionally, but in some embodiments preferably, the thermoplastic polymer from which the particles are formed may include terminal functional or reactive groups. Suitable functional or reactive groups include, but are not limited to, amine, phenol, maleimide, and carboxyl groups. Such reactive groups may be included for any of a variety of purposes, including but not limited to promoting compatibility and adhesion between matrices, such as: the first and second curable components of the dual cure system, and the thermoplastics, may react with a thermosettable component or UV curable component to form stable linkages, may react with thermosettable components or UV curable component transiently, to control domain size and morphology of phase-separated thermoplastic, may catalyze cure of thermosettable components, acting as a latent catalyst (especially amine-terminated with epoxy and cyanate ester), etc.

In general, the thermoplastic particles have an average diameter of from 0.5 to 10, 20, or 50 microns. They may be prepared from a thermoplastic polymer by any suitable technique, including but not limited to mechanical grinding, cryo milling, spray drying, coagulation, etc., along with sieving or other techniques known to those skilled in the art.

Where applicable, the dissolution rate of the thermoplastic particles is preferably such that the particles solubilize or dissolve in the intermediate before cure of the thermosettable resin (e.g., before the heat-polymerizable monomers and/or prepolymers polymerize), as shown schematically in FIG. 1, where $T^1$ represents the temperature at which the thermoplastic particles solubilize or dissolve in the intermediate, $T^2$ represents the temperature at which the heat-polymerizable monomers and/or prepolymers polymerize in the intermediate (e.g., with the difference between $T^1$ and $T^2$, being, in some embodiments, at least 1, 2 or 3 degrees Centigrade, up to 10 or 20 degrees Centigrade or more), and the difference between $t^1$ and $t^2$ represents the time required during the step of heating the intermediate to reach $T^2$ from $T^1$ (e.g., throughout the body of the intermediate). In addition, in some embodiments $t^1$ and $T^1$ may represent the time and temperature at which the Diels-Alder adduct breaks into its constituent components (represented by arrows facing away from one another; e.g., re-forms the bis-maleimide), so that the constituent such as the bis-maleimide may participate in the subsequent heat-polymerization reaction (represented by arrows facing towards one another).

In addition to selection of the materials, $T^1$ and $T^2$ can be further tuned or altered by: modifying the surface area of the thermoplastic particle, which can be fully dense or porous, adjusting the choice or amount of catalysts, accelerators, and/or latent catalysts included in the resin for the thermosetting reaction, including one or more plasticizers, etc.

In FIG. 1, those skilled in the art will appreciate that temperatures can represent a peak around which there will be a range, and that the leading and trailing edges of respective ranges may in some situations overlap. Thus, the FIGURE is intended to represent a processing window which can be further tuned by adjusting the rate of heating, so that the thermoplastic particles solubilize, swell and/or dissolve before the heat-polymerizable groups react to such an extent as to unduly inhibit the solubilizing/swelling/dissolution event.

D. Diels-Alder Adducts.

Diels-Alder adducts used in the present invention are, in general, compounds of Formula I:

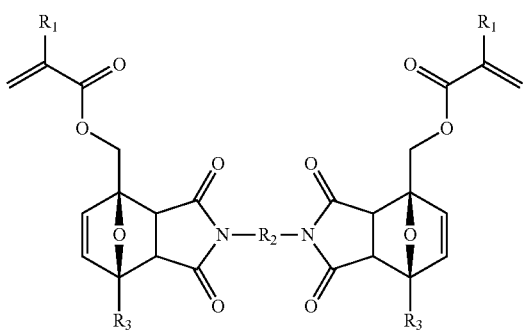

where $R_1$ and $R_3$ are each independently H or $CH_3$, and $R_2$ is a linking group. Compounds of Formula I can be produced by reacting a furan of Formula II:

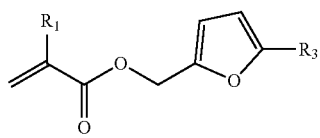

wherein $R_1$ and $R_3$ are as given above, with a bis-maleimide compound of Formula III:

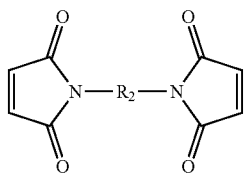

where $R_2$ is as given above, in a Diels-Alder reaction, to give the compound of Formula I. The Diels-Alder reaction may be carried out in accordance with known techniques (see, e.g., A. Gandini, *The furan/maleimide Diels-Alder reaction: A versatile click-unclick tool in macromolecular synthesis*, Progress in Polymer Science 38, 1-29 (January 2013)) or variations thereof that will be apparent to those skilled in the art.

"Linking group" as used herein may be any suitable inorganic or organic group, such as an aliphatic, aromatic, or mixed aromatic and aliphatic group, that covalently couples two terminal groups, such as two maleimide groups. Linking groups may be substituted or unsubstituted (e.g., with halo such as chloro or fluoro, C1-C4 alkoxy, hydroxy, etc.), and may optionally contain hetero atoms (e.g., one, two, three or more selected from N, O, S, etc.). Examples of suitable linking groups include, but are not limited to:

—$(CH_2)_{1-8}$— (e.g., —$CH_2$—, —$CH_2CH_2$—, etc);
—$CH_2CH_2C_6F_{12}CH_2CH_2$—;
—$C_6H_4$— (2 isomers);
—$C_6H_4$—O—$C_6H_4$—;
—$C_6H_4$—$CH_2$—$C_6H_4$—;
—$C_6H_4$—O—$C_6H_4$—O—$C_6H_4$— (2 isomers);
—$C_6H_4$—O—$C_6H_4$—$C(CH_3)_2$—$C_6H_4$—O—$C_6H_4$—;
—$C_6H_4$—O—$C_6H_4$—$C(CF_3)_2$—$C_6H_4$—O—$C_6H_4$—;
—$C_6H_3CF_3$—O—$C_6H_4$—$C(CF_3)_2$—$C_6H_4$—O—$C_6H_3CF_3$—;
—$C_6H_4$—O—$C_6H_4$—(C=O)—$C_6H_4$—O—$C_6H_4$—;
—$C_6H_4$—S—$C_6H_4$—$C(CH_3)_2$—$C_6H_4$—S—$C_6H_4$—;
—$C_6H_4$—$S(=O)_2$—$C_6H_4$—;
-4-methyl-1,3-phenylene bismaleimide (linker portion or derivative thereof); and
-3,3'-dimethyl-5,5'-diethyl-4,4'-diphenylmethane bismaleimide (linker portion or derivative thereof).

Particular examples of Diels-Alder reactions as described above and adducts formed thereby, which adducts can be used in the resins and methods described herein, are given in Schemes 1-2 below:

Scheme 1: Furan-Maleimide Diels-Alder Adduct

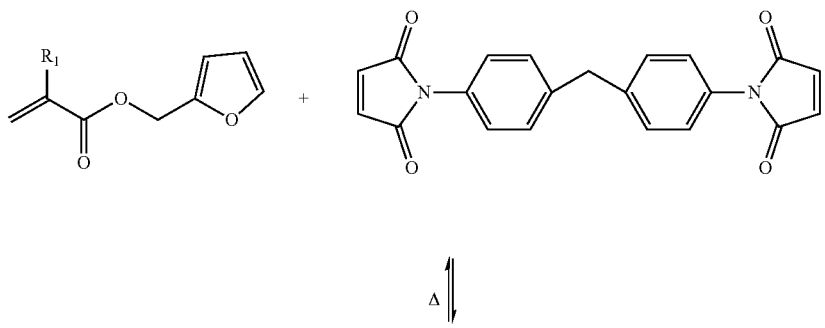

-continued

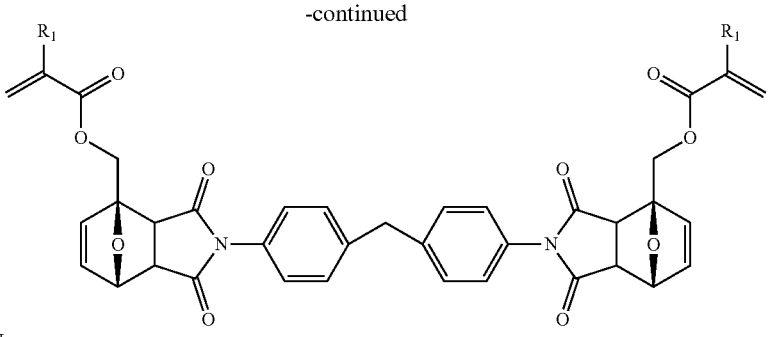

R₁: H, CH₃

Scheme 2: Furan-Maleimide Diels-Alder Adduct

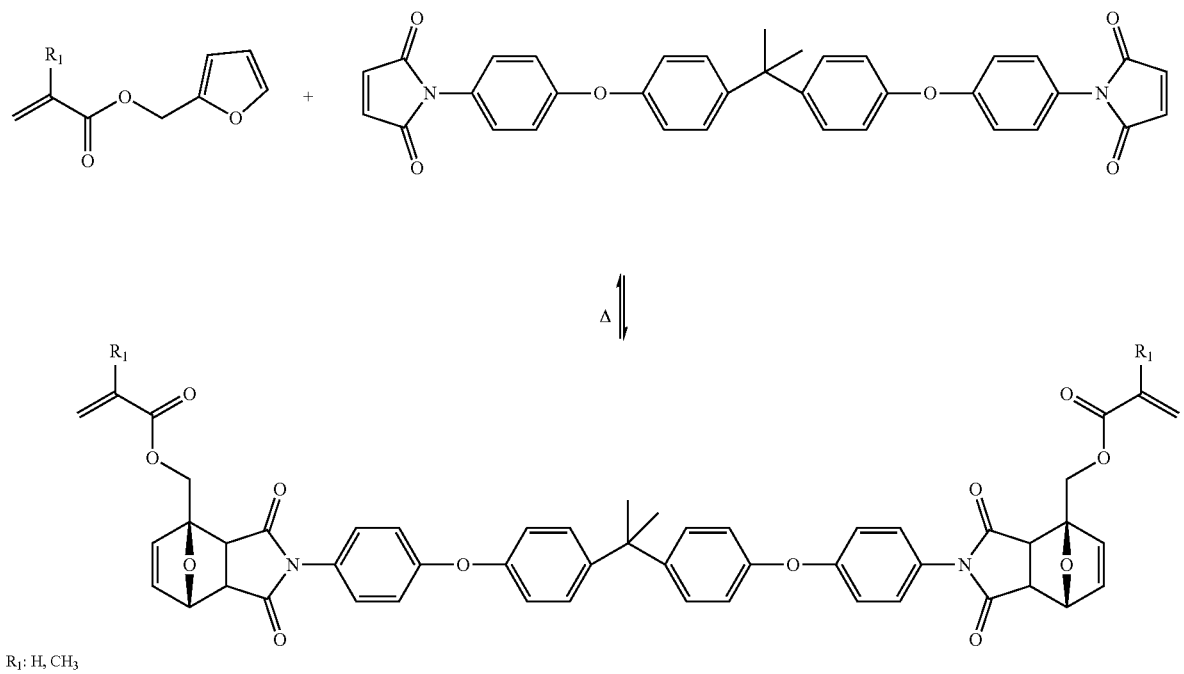

R₁: H, CH₃

E. Additional Resin Ingredients.

Photoinitiators included in the polymerizable liquid (resin) can be any suitable photoiniator, including type I and type II photoinitiators and including commonly used UV photoinitiators, examples of which include, but are not limited to, acetophenones (diethoxyacetophenone, for example), phosphine oxides such as diphenyl(2,4,6-trimethylbenzoyl)phosphine oxide, phenylbis(2,4,6-trimethylbenzoyl) phosphine oxide (PPO), Irgacure 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 m average diameter).

The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, spohorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Hardeners.

Additional components (hardeners) can be used which react with the liberated maleimide. Any suitable hardener may be used (see, e.g., U.S. Pat. Nos. 5,599,856; 6,656,979; 8,632,654; and 9,3115,698). In some embodiments, the hardener comprises an amine or polyamine (e.g., an aromatic amine or polyamine, a cycloaliphatic amine or polyamine, an aliphatic amine or polyamine such as a polyether amine, etc.).

In some embodiments, the hardener comprises a thiol or polythiol, an allyl or polyallyl (diallyls, triallyls); a maleimide (including but not limited to those described herein above and below); a vinyl ether, etc.

Particular examples of suitable thiol hardeners include, but are not limited to, 4,4'-dimercaptodiphenylether, 4,4'-dimercaptobiphenyl, trimethylolpropane tris(3-mercaptopropionate), pentaerythritol tetrakis(3-mercaptopropionate), 1,3,5-tris(3-mercaptopropyl)-1,3,5-triazine-2,4,6-trione, etc.

Examples of suitable allyls include, but are not limited to, allyl (meth)acrylate, 2,2'-diallylbisphenol A and triallyl-1,3, 5-triazine-2,4,6-(1H,3H,5H)-trione.

In some embodiments, the hardener comprises a latent hardener (including mixtures thereof): That is, a hardener having a low reactivity at lower temperatures, and/or which is sparingly soluble at lower temperatures, such that the hardener can be more stable at room temperature, but then activated upon heating. Numerous examples of latent hardeners are known (See, e.g., U.S. Pat. No. 8,779,036; see also U.S. Pat. No. 4,859,761). Particular examples include substituted guanidines and aromatic amines, such as dicyandiamide, benzoguanamine, o-tolylbiguanidine, bis(4-aminophenyl) sulfone (also known as diamino diphenylsulfone: DDS), bis(3-aminophenyl) sulfone, 4,4'-methylenediamine, 1,2- or 1,3- or 1,4-benzenediamines, bis(4-aminophenyl)-1, 4-diisopropylbenzene (e.g., EPON 1061 from Shell), bis(4-amino-3,5-dimethylphenyl)-1,4-diisopropylbenzene (e.g., EPON 1062 from Shell), bis(aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenylcyclohexane, methylenebis (2,6-diethylaniline) (e.g., LONZACURE™ M-DEA from Lonza), methylenebis(2-isopropyl-6-methylaniline) (e.g., LONZACURE™ M-MIPA from Lonza), methylenebis(2,6-diisopropylaniline) (e.g., LONZACURE™ M-DIPA from Lonza), 4-aminodiphenylamine, diethyltoluenediamine, phenyl-4,6-diaminotriazine, and lauryl-4,6-diaminotriazine. Still other examples include N-acylimidazoles such as 1-(2', 4',6'-trimethylbenzoyl)-2-phenylimidazole or 1-benzoyl-2-isopropylimidazole (see, e.g., U.S. Pat. Nos. 4,436,892 and 4,587,311); cyanoacetyl compounds such as neopentyl glycol biscyanoacetate, N-isobutylcyanoacetamide, 1,6-hexamethylene biscyanoacetate or 1,4-cyclohexanedimethanol biscyanoacetate (see, e.g., U.S. Pat. No. 4,283,520); N-cyanoacylamide compounds such as N,N'-dicyanoadipic diamide (see, e.g., U.S. Pat. Nos. 4,529,821, 4,550,203, and 4,618,712; acylthiopropylphenols (see, e.g., U.S. Pat. No. 4,694,096) and the urea derivatives such as toluene-2,4-bis (N,N-dimethylcarbamide) (see, e.g., U.S. Pat. No. 3,386, 955); and aliphatic or cycloaliphatic diamines and polyamines if they are sufficiently unreactive. An example which may be mentioned here is polyetheramines, e.g., JEFFAMINE® 230 and 400. Aliphatic or cycloaliphatic diamines or polyamines whose reactivity has been reduced by steric and/or electronic influencing factors or/and are sparingly soluble or have a high melting point, e.g., JEFF-LINK® 754 (Huntsman) or CLEARLINK 1000 (Dorf Ketal), can also be used.

Dyes/non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a a hydroxybenzophenone, hydroxyphenylbenzotriazole, oxanilide, benzophenone, thioxanthone, hydroxypenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695, 643, the disclosures of which are incorporated herein by reference.

Fillers.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 20150215430. The toughener may be uniformly distributed in the form of particles in the cured product. The particles could be less than 5 microns (µm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-Shell Rubbers.

Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

Methods of Making.

Polymerizable liquids or resins as described herein are used to make three-dimensional objects in a first "light" cure (typically by additive manufacturing) which generates an intermediate object, followed by a second heat cure of that intermediate object.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, US Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication, but the irradiating and/or advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising a first component of the polymerizable liquid in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the intermediate three-dimensional object is formed, it is optionally washed, optionally dried (e.g., air dried) and/or rinsed (in any sequence). It is then further cured, preferably by heating.

Heating may be active heating (e.g., in an oven, such as an electric, gas, solar oven or microwave oven, or combination thereof), or passive heating (e.g., at ambient (room) temperature).

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

The present invention is explained in greater detail in the following non-limiting Examples.

Example 1

Dual Cure Resin Containing a Diels-Alder Adduct 42.5 grams of Diels-Alder "Adduct A" (the adduct of Scheme 1 above where $R_1$ is H) as a light-reactive constituent, 5 grams of dimethylacrylamide (included to lower the viscosity of the resin), 42.5 grams of Bisphenol E dicyanate monomer, and 1 gram of phenylbis(2,4,6-trimethylbenzoyl) phosphine oxide photoinitiator was mixed in a planetary centrifugal mixer at 2000 rpm for 10 minutes to yield a homogeneous, dual cure, cyanate ester, resin.

Example 2

Dual Cure Resin Containing Thermoplastic Particles

To the resin of Example 1 was added 10 grams of a commercially available micronized poly(ethersulfone) particles (Solvay Virantage VW10200, phenol-terminated, 47 kDa) and mixed in a planetary centrifugal mixer at 1000 rpm for 2 minutes to yield a resin with dispersed thermoplastic particles.

Example 3

Object Production with a Dual Cure Resin Containing

Both a Diels-Alder Adduct and Thermoplastic Particles

The resin of Example 2 was formed into a three-dimensional intermediate using a continuous liquid interface production (CLIP) process on a Carbon, Inc. M1 apparatus (Available from Carbon, Inc., Redwood City, Calif., USA) in continuous exposure mode, using a 385 nm LED projector with a light intensity of 9 mW/cm$^2$ at a speed of 10 mm/hour. The formed material was washed and pre-cured for 120 minutes at 95° C. During this pre-cure, the dispersed thermoplastic particles dissolved into the matrix, as evidenced by the change from opaque to translucent in the printed part (data not shown). Following this pre-cure, the part was cured for 60 minutes at 120° C., 120 minutes at 180° C., and 60 minutes at 220° C. to yield the desired product. The mechanical and thermal properties of products produced from such resins were evaluated by producing dual cured mechanical test samples in this manner.

The foregoing is illustrative of the present invention, and is not to be construed as limiting thereof. The invention is defined by the following claims, with equivalents of the claims to be included therein.

That which is claimed is:

1. A dual cure resin useful for making a three-dimensional object by stereolithography, comprising:
    (a) light-polymerizable monomers and/or prepolymers that can participate in forming an intermediate object by stereolithography;
    (b) heat-polymerizable monomers and/or prepolymers;
    (c) thermoplastic particles dispersed in said resin, which particles are (i) insoluble in said resin and insoluble during a first, light, cure in which an intermediate object is produced, and which particles (ii) dissolve or swell in the intermediate object during a second, heat, cure thereof;
    (d) a Diels-Alder adduct, which adduct is light polymerizable during stereolithography and so can participate in forming an intermediate object, and on heating of the intermediate object yields a bis-maleimide that can further react and/or polymerize in the intermediate object during heat cure thereof to thereby form the three-dimensional object; and
    (e) optionally, a hardener.

2. The resin of claim 1, wherein said thermoplastic particles dissolve or swell at a lower temperature than the temperature at which said heat-polymerizable monomers and/or prepolymers polymerize.

3. The resin of claim 1, wherein said resin comprises a cyanate ester, epoxy, bis-maleimide, benzoxazine, or phenolic resin.

4. The resin of claim 1, wherein said thermoplastic particles are comprised of a polymer having a glass transition temperature greater than 130° C.

5. The resin of claim 1, wherein said thermoplastic particles are comprised of a thermoplastic polymer having a weight average molecular weight of from 1 kilodalton up to 1,000 kilodaltons.

6. The resin of claim 1, wherein:
    (i) said resin comprises a cyanate ester or epoxy resin, and said thermoplastic particles comprise polyethersulfone, polysulfone, polyarylsulfone, polyimide, polyetherimide, or a combination thereof; or
    (ii) said resin comprises a polyester resin, or a polymethacrylate resin, and said thermoplastic particles comprise bisphenol A (BPA) polycarbonate.

7. The resin of claim 1, wherein said Diels-Alder adduct has a structure of

Formula I

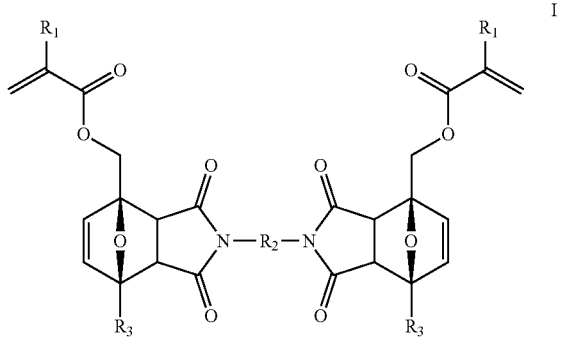

where $R_1$ and $R_3$ are each independently H or $CH_3$, and $R_2$ is a covalent linking group.

8. The resin of claim 7, wherein said linking group is selected from the group consisting of:
—$(CH_2)_{1-8}$—;
—$CH_2CH_2C_6F_{12}CH_2CH_2$—;
—$C_6H_4$—;
—$C_6H_4$—O—$C_6H_4$—;
—$C_6H_4$—$CH_2$—$C_6H_4$—;
—$C_6H_4$—O—$C_6H_4$—O—$C_6H_4$—;
—$C_6H_4$—O—$C_6H_4$—$C(CH_3)_2$—$C_6H_4$—O—$C_6H_4$—;
—$C_6H_4$—O—$C_6H_4$—$C(CF_3)_2$—$C_6H_4$—O—$C_6H_4$—;
—$C_6H_3CF_3$—O—$C_6H_4$—$C(CF_3)_2$—$C_6H_4$—O—$C_6H_3CF_3$—;
—$C_6H_4$—O—$C_6H_4$—(C=O)—$C_6H_4$—O—$C_6H_4$—;
—$C_6H_4$—S—$C_6H_4$—$C(CH_3)_2$—$C_6H_4$—S—$C_6H_4$—;
—$C_6H_4$—$S(=O)_2$—$C_6H_4$—;
4-methyl-1,3-phenylene bismaleimide; and
3,3'-dimethyl-5,5'-diethyl-4,4'-diphenylmethane bismaleimide.

9. The resin of claim 1, wherein the light polymerizable monomers and/or prepolymers comprise reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, vinyl ethers, and combinations thereof.

10. The resin of claim 1, wherein the heat polymerizable monomers and/or prepolymers comprise reactive end groups selected from the group consisting of: epoxy/amine, epoxy/hydroxyl, oxetane/amine, oxetane/alcohol, isocyanate/hydroxyl, isocyanate/amine, isocyanate/carboxylic acid, cyanate ester, anhydride/amine, amine/carboxylic acid, amine/ester, hydroxyl/carboxylic acid, hydroxyl/acid chloride, amine/acid chloride, vinyl/Si—H, Si—Cl/hydroxyl, Si—Cl/amine, hydroxyl/aldehyde, amine/aldehyde, hydroxymethyl or alkoxymethyl amide/alcohol, aminoplast, alkyne/azide, click chemistry reactive groups, alkene/sulfur, alkene/thiol, alkyne/thiol, hydroxyl/halide, isocyanate/water, Si—OH/hydroxyl, Si—OH/water, Si—OH/Si—H, Si—OH/Si—OH, perfluorovinyl, diene/dienophiles, olefin metathesis polymerization groups, olefin polymerization groups for Ziegler-Natta catalysis, and ring-opening polymerization groups and mixtures thereof.

11. The resin of claim 1, wherein said hardener is present and comprises a compound having amine, thiol, vinyl ether, maleimide, or allyl reactive end groups.

12. The resin of claim 1, further comprising at least one photoinitiator, optionally at least one dye, and optionally at least one filler.

13. A method of making a three-dimensional object, comprising:
(a) providing a resin of claim 1;
(b) producing by stereolithography a three-dimensional intermediate from said dual cure resin, said intermediate having the same shape as, or a shape to be imparted to, said three-dimensional object;
(c) optionally washing said intermediate object; and then
(d) heating said intermediate to produce said three-dimensional object.

14. The method of claim 13, wherein said heating step (d) is carried out at a temperature below the glass transition temperature of the three-dimensional object.

15. The method of claim 13, wherein said thermoplastic particles solubilize or dissolve in said intermediate during said heating step (d).

16. The method of claim 13, wherein said thermoplastic particles solubilize or dissolve in said intermediate at a lower temperature than the temperature at which said heat-polymerizable monomers and/or prepolymers polymerize.

17. The method of claim 13, wherein said heating step comprises a first heating step during which said thermoplastic particles solubilize or dissolve, followed by a second heating step, at a temperature higher than said first heating step, during which said heat-polymerizable monomers and/or prepolymers polymerize to thereby form said three-dimensional object.

18. The method of claim 13, wherein, during said heating step (d), the thermoplastic particles form a miscible interpenetrating network in the three-dimensional object, or phase separate into a morphology that toughens the three-dimensional object.

19. The method of claim 13, wherein said bis-maleimide has the structure of Formula III

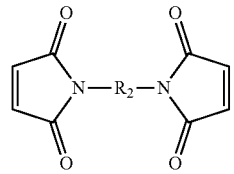

where $R_2$ is as given above.

20. The method of claim 13, wherein said hardener is present, and wherein said hardener reacts with said bis-maleimide during said heating step.

21. The method of claim 13, wherein said light polymerizable monomers and/or prepolymers form a solid polymer scaffold during said producing step (b), which scaffold degrades during said heating step (d) and forms a constituent necessary for the polymerization of said heat polymerizable monomers and/or prepolymers.

22. The method of claim 13, wherein said producing step (b) is carried out by bottom-up stereolithography.

23. The method of claim 13, wherein said producing step (b) is carried out by continuous liquid interface production.

\* \* \* \* \*

UNITED STATES PATENT AND TRADEMARK OFFICE
CERTIFICATE OF CORRECTION

PATENT NO. : 11,629,202 B2
APPLICATION NO. : 16/474971
DATED : April 18, 2023
INVENTOR(S) : Menyo et al.

It is certified that error appears in the above-identified patent and that said Letters Patent is hereby corrected as shown below:

In the Specification

Column 12, Line 51: Please correct "20 m" to read --20 µm--

Column 12, Line 61: Please correct "spohorescent" to read --phosphorescent--

Column 13, Line 5: Please correct "9,3115,698" to read --9,315,698--

In the Claims

Column 17, Line 41, Claim 1: Please correct "obj ect" to read --object--

Signed and Sealed this
Twenty-fifth Day of July, 2023

Katherine Kelly Vidal
*Director of the United States Patent and Trademark Office*